United States Patent
Huxel

(10) Patent No.: US 7,185,217 B1
(45) Date of Patent: Feb. 27, 2007

(54) METHOD AND APPARATUS FOR PROVIDING A CLOCK SIGNAL TO A PLURALITY OF DESTINATION RECEIVERS IN AN INTEGRATED CIRCUIT ENVIRONMENT

(75) Inventor: Jeffrey A. Huxel, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 478 days.

(21) Appl. No.: 10/412,985

(22) Filed: Apr. 14, 2003

(51) Int. Cl.
*G06F 1/10* (2006.01)

(52) U.S. Cl. .............. 713/500; 713/400; 713/502; 713/503

(58) Field of Classification Search ........ 713/400, 713/500–503
See application file for complete search history.

(56) References Cited

U.S. PATENT DOCUMENTS

| | | | |
|---|---|---|---|
| 5,691,662 A * | 11/1997 | Soboleski et al. ........ 327/292 |
| 5,798,935 A | 8/1998 | Doreswamy et al. ....... 364/488 |
| 5,866,924 A * | 2/1999 | Zhu ........................... 257/208 |
| 6,070,211 A | 5/2000 | Neal et al. .................. 710/106 |
| 6,208,161 B1 | 3/2001 | Suda ............................ 326/30 |
| 6,230,300 B1 | 5/2001 | Takano .......................... 716/2 |
| 6,260,175 B1 | 7/2001 | Basel ............................. 716/1 |
| 6,353,352 B1 * | 3/2002 | Sharpe-Geisler ............ 327/295 |
| 6,433,606 B1 | 8/2002 | Arai ............................ 327/291 |

OTHER PUBLICATIONS

S. McMahan, B. Erickson, S. McMahon, J. Huxel, A. Husrieh, Z. Wen and D. Steiss, "A 600MHz NT3 Network Processor," IEEE International Solid-State Circuits Conference, pp. 256-257, 2003.

* cited by examiner

*Primary Examiner*—James K. Trujillo
*Assistant Examiner*—Paul Yanchus, III
(74) *Attorney, Agent, or Firm*—Baker Botts L.L.P.

(57) ABSTRACT

A method for processing data is provided that includes receiving a clock signal at a source driver and communicating the clock signal to a plurality of destination receivers. The clock signal may be received at the destination receivers during a substantially equivalent time interval, the plurality of destination receivers being five.

17 Claims, 3 Drawing Sheets

METHOD AND APPARATUS FOR PROVIDING A CLOCK SIGNAL TO A PLURALITY OF DESTINATION RECEIVERS IN AN INTEGRATED CIRCUIT ENVIRONMENT

TECHNICAL FIELD OF THE INVENTION

This invention relates in general to integrated circuits and more particularly to a system and method for providing a clock signal in an integrated circuit environment.

BACKGROUND OF THE INVENTION

Data processing has become increasingly important in an integrated circuit and semiconductor environments. The ability to properly manipulate data in order to trigger functions or tasks is critical for achieving optimal processing operations at designated time intervals. Additionally, it may be important to minimize space consumption on a corresponding integrated circuit as board space allocation/occupancy on an integrated circuit remains at a premium.

In synchronous integrated circuits, clock signals may propagate to multiple end points. In order to achieve higher performance and reliable functionality, propagation delays from any given clock source to all of its corresponding end points should be matched as closely as possible. It may also be beneficial to minimize propagation delays of the clock signal in order to reduce the effects of delay or imbalance introduced by manufacturing processes. Thus, the ability to provide effective processing operations in a synchronous environment, while minimizing space consumption on a corresponding integrated circuit, provides a significant challenge to integrated circuit developers and manufacturers.

SUMMARY OF THE INVENTION

From the foregoing, it may be appreciated by those skilled in the art that a need has arisen for an improved clock signaling approach that provides the capability for integrated circuits to provide a clock signal to end points in an optimal manner. In accordance with one embodiment of the present invention, a system and method for providing a clock signal in a integrated circuit environment are provided that substantially eliminate or greatly reduce disadvantages and problems associated with conventional clock signal delivery techniques.

According to one embodiment of the present invention, there is provided a method for processing data that includes receiving a clock signal at a source driver and communicating the clock signal to a plurality of destination receivers. The clock signal may be received at the destination receivers during a substantially equivalent time interval, the plurality of destination receivers being five.

Certain embodiments of the present invention may provide a number of technical advantages. According to one embodiment of the present invention, a clock signal delivery approach is provided that allows for the balancing of a significant number of end points. For example, the provided clock tree structure can balance $5^M$ end points in M levels of partitioning. Such a capability in balancing end points is even more pronounced in larger integrated circuits where additional stages or levels may be eliminated because a proper fanning out may be achieved using a 5:1 tree configuration. The clock delivery architecture offers considerable scalability to a corresponding integrated circuit configuration.

Another technical advantage associated with one embodiment of the present invention relates to its size. The clock signal delivery architecture offered provides a compact structure that occupies minimal space in an integrated circuit. Space and area allocations on an integrated circuit are generally at a premium. This may be particularly so in cases where sophisticated configurations are being implemented to achieve enhanced processing operations. Such architectures may not be capable of accommodating an excessive number of components used to achieve a proper clock signal fan out. The present invention provides a compact solution in implementing a tree structure that occupies little space on an integrated circuit board. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
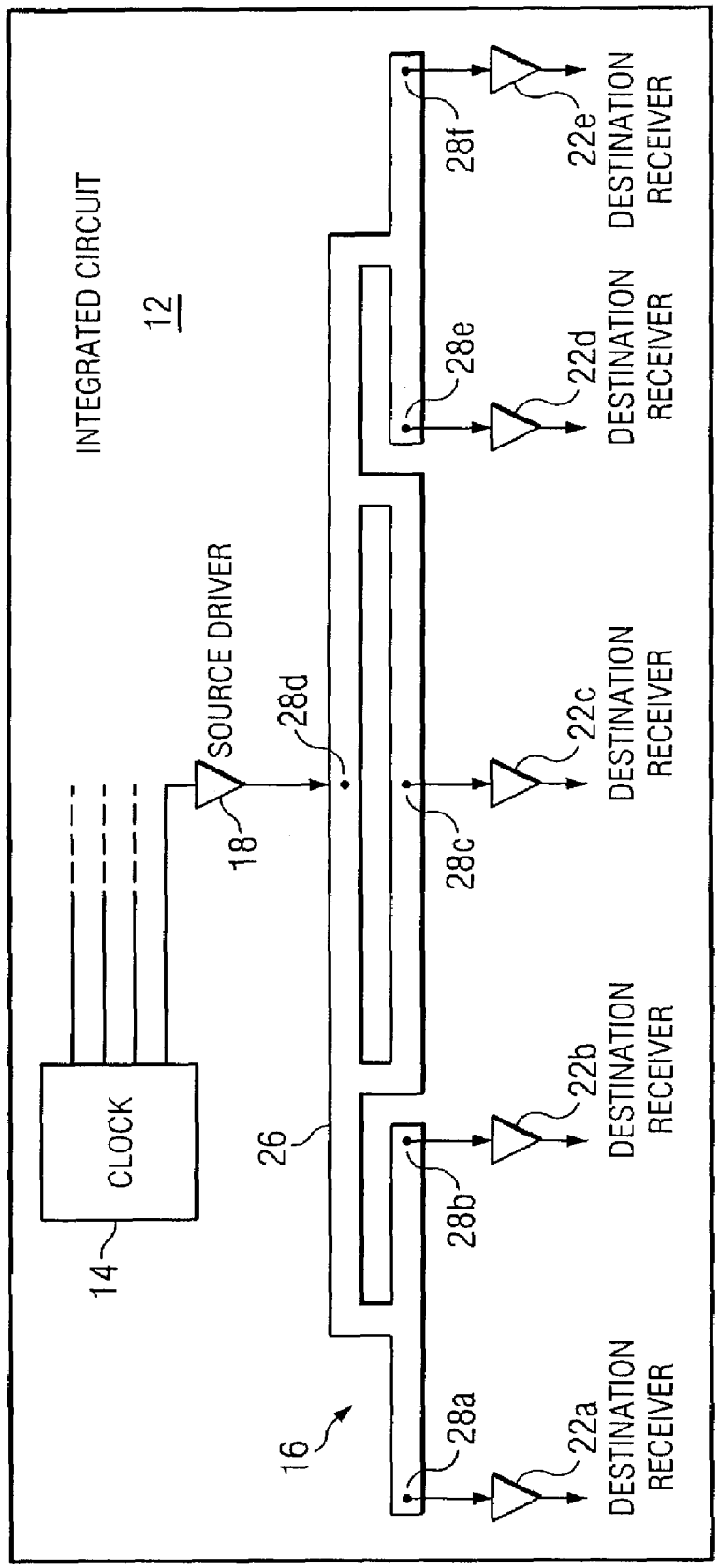
FIG. 1 is a simplified block diagram of a processing system that includes a clock tree in accordance with one embodiment of the present invention.

FIG. 1 is a simplified block diagram of a processing system 10 in accordance with one embodiment of the present invention. Processing system 10 may include an integrated circuit 12 that may include a clock 14 and a clock tree 16. Clock tree 16 may include a source driver 18, multiple destination receivers 22a–e, and a metal interconnect 26 that suitably couples destination receivers 22a–e to source driver 18 via a series of nodes (or connection points) 28a–f. Clock tree 16 may be positioned in any suitable integrated circuit or semiconductor environment. For example, processing system 10 may be used in conjunction with an application specific integrated circuit (ASIC), a suitable memory element, a processor, or any other electronic element that implements synchronization techniques using any type of clock signal or clock pulse.

In accordance with the teachings of the present invention, clock tree 16 positions end points (or destination receivers 22a–e) into groups of five and balances them together. A specific layout structure or configuration of clock tree 16 may be used to match delays to destination receivers 22a–e, which each belong to a particular group. This structure minimizes imbalance parameters associated with the manufacture of integrated circuit 12. Clock tree 16 provides a set of redundant paths (via metal interconnect 26) to the same location in properly delivering a clock signal to destination receivers 22a–e. Such an implementation allows the clock signal to arrive at the same time and thereby provides a balanced tree architecture. Clock tree 16 achieves substantially equivalent delays and may be implemented or positioned in any corresponding architecture in order to achieve proper clock signal delivery.

Processing system 10 offers a clock signal delivery architecture that provides a compact structure occupying minimal space in integrated circuit 12. Space and area allocations on integrated circuit 12 may be important considerations guiding its design and manufacture. This may be particularly so in cases where integrated circuit 12 is being used to execute sophisticated tasks to achieve enhanced processing operations. Integrated circuit 12 may not be capable of accommodating a number of components needed to achieve a proper clock signal fan out. Clock tree 16 provides a compact solution in implementing a tree structure that occupies little space on a corresponding integrated circuit board.

Integrated circuit 12 is a processing element that seeks to execute one or more designated electronic (processing) tasks. Integrated circuit 12 may include any suitable number of logic components, processors, state components, or any other appropriate device, hardware, software, component, object or element capable of operating in an integrated circuit environment. Integrated circuit 12 may have some or all of its operations synchronized by clock 14 that provides a clock pulse or clock signal for corresponding components within the architecture. Clock 14 may be running at any suitable clock speed (and have any suitable clock cycle), whereby the clock speed references the number of pulses per second generated by an oscillator that sets the tempo for processing elements. The number of pulses per second (clock speed) may be generally measured in megahertz (MHz). Certain processing elements may execute only one instruction per clock pulse, whereby more advanced processors within integrated circuit 12 can perform more than one instruction per clock pulse. The clock signal delivered by source driver 18 may be at any appropriate frequency in any suitable format. For example, source driver 18 may deliver a square wave at 500 MHz. Alternatively, source driver 18 may deliver a clock signal having any appropriate frequency being communicated in any particular format.

Source driver 18 is an element that delivers a clock signal provided by clock 14 to multiple destination receivers 22*a*–*e*. Source driver 18 is a buffer or a repeater in a particular embodiment in the present invention; however, source driver 18 may be any other suitable element that is capable of delivering the clock signal provided by clock 14. For example, source driver 18 may simply be a wire delivering the clock signal via node 28*d* to nodes 28*a*, 28*b*, 28*c*, 28*e*, and 28*f*. Source driver 18 may alternatively be any component, device, element, object, hardware, or software that is capable of delivering any form of a clock signal to corresponding end points (or selected destination receivers).

Destination receivers 22*a*–*e* are logic elements that receive a clock signal from source driver 18, which may trigger operations or tasks to be completed by each destination receiver 22*a*–*e*. Destination receivers 22*a*–*e* may be flip flops, state elements, buffers or repeaters for delivering information to a next stage, or any other element, component, device, or object that requires a clock signal or uses a clock signal to trigger or initiate any act or task. Destination receivers 22*a*–*e* may be spaced equally apart from each other in one embodiment such that a signal is received during a substantially similar time interval. Alternatively, destination receivers 22*a*–*e* may be positioned or spaced in any other suitable manner or configuration in accordance with particular needs. Destination receiver 28*d* may operate as the point element that receives the clock signal first, before the clock signal is delivered to destination receivers 22*a*, 22*b*, 22*c*, 22*e*, and 22*f*. Additionally, destination receiver 22*d* may be viewed as the one value in a corresponding representation of a 5:1 clock tree structure.

Metal interconnect 26 is a (generally) conductive interconnecting element capable of facilitating the propagation of a clock signal being delivered by source driver 18. Metal interconnect 26 may comprise any suitable material operable to effectuate this operation. Additionally, metal interconnect 26 may be shaped or configured in any suitable arrangement in order to provide the 5:1 fan out architecture.

In operation, clock tree 16 operates to fan out a given clock signal being delivered by clock 14. The configuration of clock tree 16 illustrates a number of redundant paths to the same location (i.e. destination receivers 22*a*–*e*). This allows clock signals propagating along metal interconnect 26 to arrive at the same time and thereby create a balanced integrated circuit environment. The delays produced by metal interconnect 26 are substantially equivalent. The clock signal may be transmitted via metal interconnect 26 (with some delay being provided on the wires and metal interconnect 26) allowing a clock signal to arrive at the same time at a designated location. Alternatively, metal interconnect 26 may have any other suitable dimensions (other than those illustrated in FIG. 1) that allows a 5:1 clock fan out. In addition, such a configuration may be symmetric, as illustrated by clock tree 16, which allows clock tree 16 to view or realize the same downstream load. Alternatively, the configuration may be asymmetric in providing suitable paths to destination receivers 22*a*–*e*.

Figure 2:
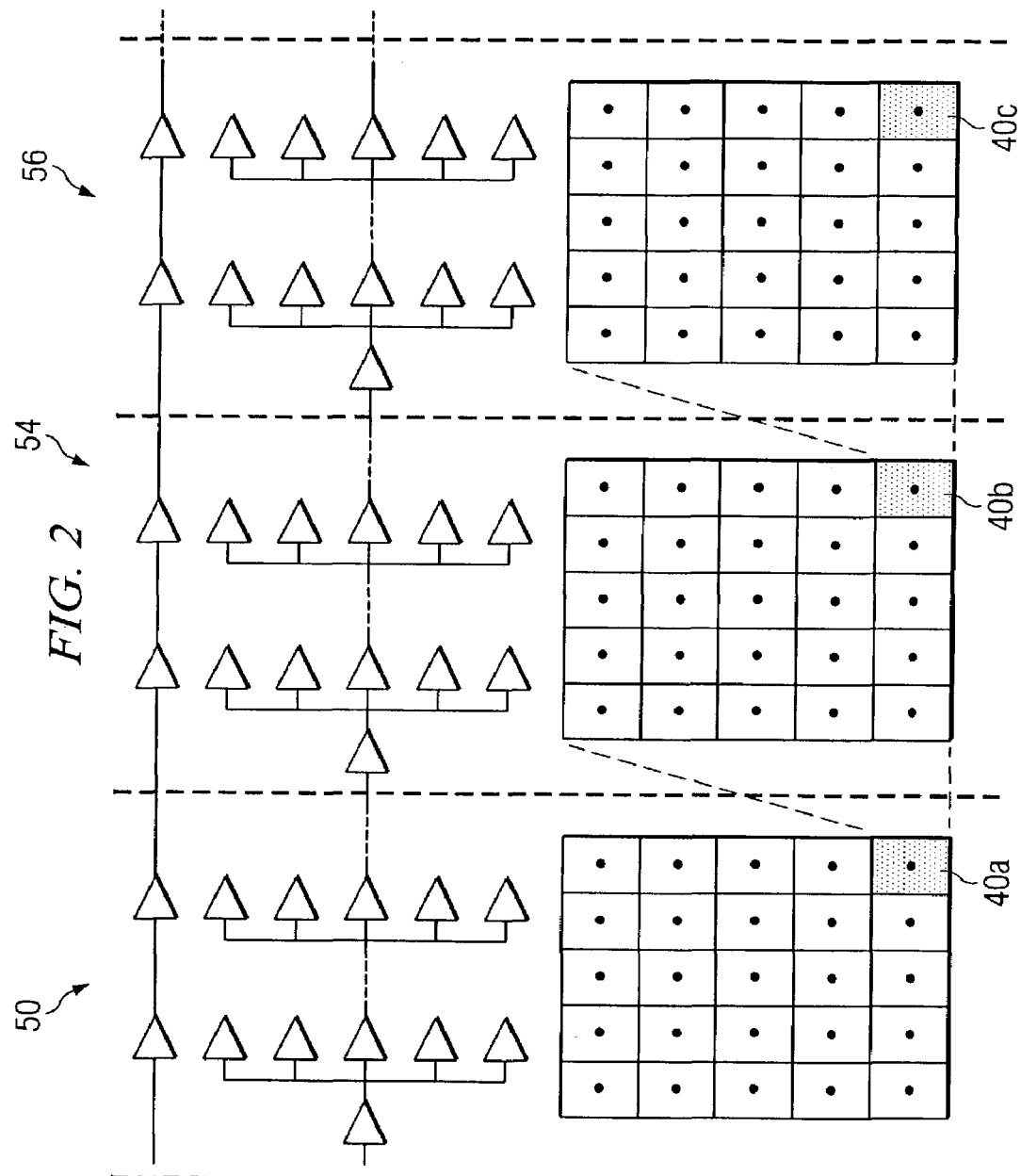
FIG. 2 is a simplified schematic diagram of one example implementation of the clock tree being replicated several times.

FIG. 2 is a simplified schematic diagram illustrating an example embodiment of clock tree 16 being replicated several times as elements 50, 54, and 56. The diagrams of FIG. 2 illustrate an appropriate fanning out of a set of clock signals 40*a*–*c* (or starting points) provided by a suitable clock generator. In addition, each diagram represents two levels of a fan out (illustrated by a series of buffers or repeaters or other logic elements) providing a total of 15625 ($5^6$) destinations (versus 4096 ($4^6$)) for a single source driver. The illustrations of FIG. 2 could continue with additional stages or levels that are provided in accordance with particular processing needs. The illustrations of FIG. 2 also illustrate the power of clock tree 16 in providing multiple levels and enhanced scalability for an integrated circuit.

Clock signals 40*a*–*c* are provided as shaded portions that reflect a partitioning of sub blocks within each element. Each non-shaded block within elements 50, 54, and 56 may represent any suitable processing element, such as embedded processors, interface controllers, and other logic elements for example. The shaded portions further represent magnifications that are repeated in subsequent iterations. Additionally, each center point of the diagrams provide a point from which to fan out to other end points.

The implementation of FIG. 2 may achieve an adequate amount of fan outs using only two levels instead of three or more that may be needed for standard H-tree configurations. For example, in such an H-tree configuration each stage could consume 200 pico seconds, whereby a significant number of stages or levels provide a substantial delay for a corresponding integrated circuit. Clock tree 16 may eliminate such a problem by providing an element capable of offering a considerable fan out with minimal levels.

Figure 3:
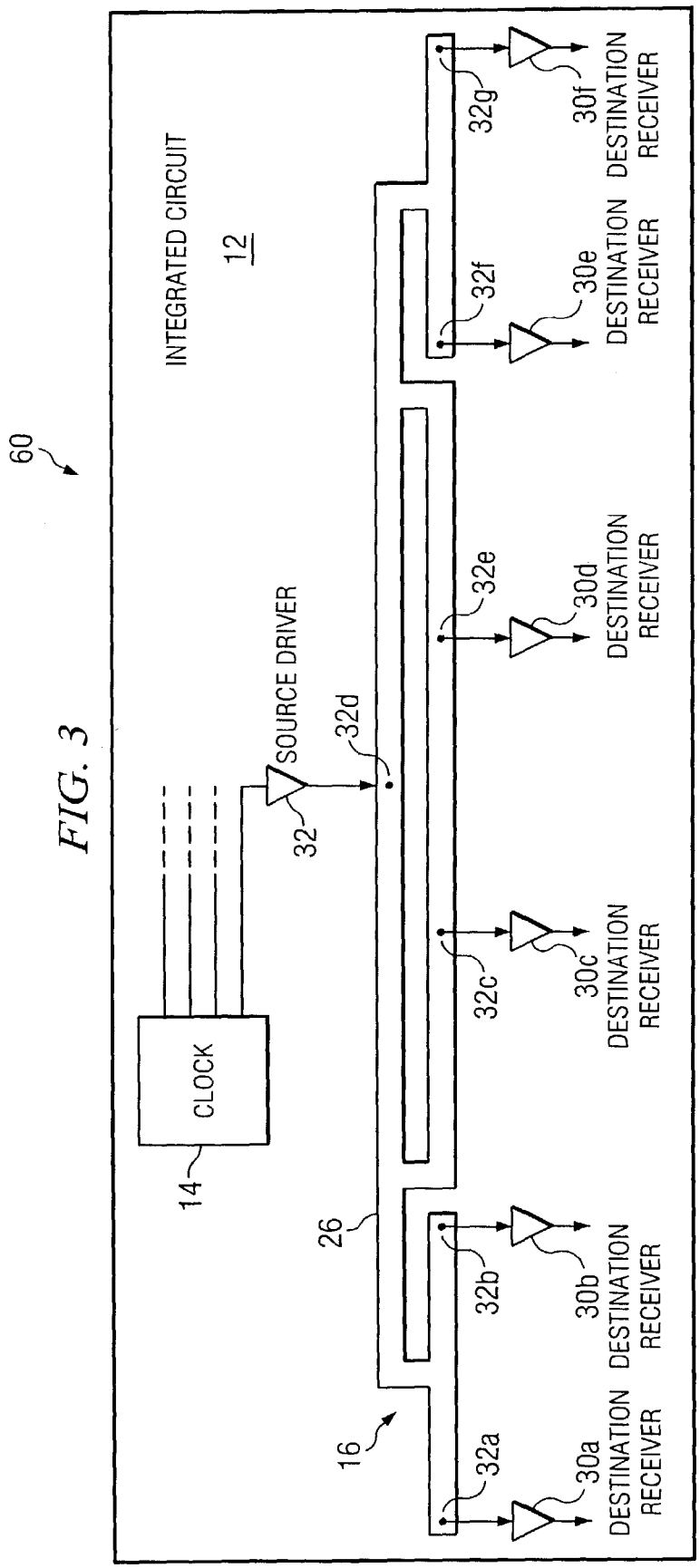
FIG. 3 is a simplified block diagram of an alternative embodiment of the clock tree.

FIG. 3 is a simplified block diagram of an alternative embodiment of the present invention that provides a clock tree 60 offering a 6:1 fan out. Clock tree 60 behaves in a similar manner to that of clock tree 16 and may include multiple destination receivers 30*a*–*f*, a series of nodes (or connection points) 32*a*–*g*, and a corresponding source driver 32. Tree structure 60 may be designed such that it provides symmetrical interconnect configurations in offering a substantially equivalent delay in delivering a clock signal to destination receivers 30*a–f*. Clock tree 60 may provide redundant paths to the same location such that all clock signals arrive at the same time in providing a balanced integrated circuit environment. Clock tree 60 provides for even more scalability in offering a 6:1 fan out architecture capable of accommodating a significant number of destination receivers.

In operation, clock tree 60 behaves in a similar manner to that of clock tree 16 in fanning out a clock signal. A clock signal may be delivered by clock 14 to source driver 32, which fans out the clock signal to destination receivers 30*a–f*. Destination receivers 30*a–f* may then be triggered to execute some task or each of these elements may alternatively communicate the clock signal to any suitable next destination.

Although the present invention has been described in detail with reference to particular configurations, processing system 10 may be modified or changed significantly without departing from the scope of the present invention. For example, clock trees 16 and 60 may be provided with metal interconnects that weave elaborate or serpentine patterns that achieve a substantially equivalent delay in delivering a clock signal to corresponding destination receivers. Additionally, the material used in metal interconnects may be changed in order to accommodate varying lengths of wire or interconnect structures in effectively delivering clock signals at substantially concurrent times. Moreover, other appropriate delays may be achieved by modifying or altering the architecture (or composition) of tree structures 16 and 60 in order to achieve 5:1 or 6:1 fan out configurations.

In addition, although processing system 10 has been described with reference to an integrated circuit that potentially uses a square wave clock signal, processing system 10 has numerous other applications. For example, processing system 10 could be used outside the realm of integrated circuits for matching distribution of data from a source to five or six destinations. For example, a board level application may be implemented where it is desired to distribute data from one chip out to five or six (or more or less where appropriate) other chips in allowing all of the receiving chips to receive the data concurrently. Moreover, the same principle may be provided over greater distances (miles or kilometers) in the context of communication delivery. For example, fiber optic networks that broadcast data may benefit from the teachings of the present invention in delivery information at synchronous time intervals using the fan out configuration of processing system 10.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for processing data, comprising:
   a number of destination receivers operable to receive a clock signal from a source driver, wherein the number of destination receivers is a multiple of five;
   a metal interconnect element providing a number of equidistant pathways to the destination receivers that enable the clock signal to arrive at each of the destination receivers in a substantially equivalent time interval;
   wherein the number of equidistant pathways is equal to the number of destination receivers; and
   wherein the metal interconnect element is not trimmed or coupled to a dumb receiver.

2. The apparatus of claim 1, further comprising:
   a clock generator coupled to the source driver and operable to provide the clock signal to the source driver.

3. The apparatus of claim 2, further comprising:
   a plurality of nodes operable to couple the destination receivers to the metal interconnect, wherein one or more of the destination receivers are equally spaced apart from each other.

4. The apparatus of claim 2, wherein the metal interconnect provides redundant paths from the source driver to the destination receivers in order to provide substantially equivalent delays associated with each of the destination receivers receiving the clock signal.

5. The apparatus of claim 1, further comprising:
   a plurality of additional destination receivers that are operable to receive the clock signal from one or more of the destination receivers, wherein the additional destination receivers and the destination receivers collectively provide two levels of a clock tree fan out configuration.

6. The apparatus of claim 1, further comprising:
   an integrated circuit operable to execute one or more processing tasks, wherein the integrated circuit includes the source driver and the destination receivers.

7. An apparatus for processing data, comprising:
   a number of destination receivers operable to receive a clock signal from a source driver, wherein the number of destination receivers is a multiple of six;
   a metal interconnect element providing a number of equidistant pathways to the destination receivers that enable the clock signal to arrive at each of the destination receivers in a substantially equivalent time interval;
   wherein the number of equidistant pathways is equal to the number of destination receivers; and
   wherein the metal interconnect element is not trimmed or coupled to a dumb receiver.

8. The apparatus of claim 7, further comprising:
   a clock generator coupled to the source driver and operable to provide the clock signal to the source driver.

9. The apparatus of claim 8, further comprising:
   a plurality of nodes operable to couple the destination receivers to the metal interconnect, wherein one or more of the destination receivers are equally spaced apart from each other.

10. The apparatus of claim 8, wherein the metal interconnect provides redundant paths from the source driver to the destination receivers in order to provide substantially equivalent delays associated with each of the destination receivers receiving the clock signal.

11. The apparatus of claim 7, further comprising:
    a plurality of additional destination receivers that are operable to receive the clock signal from one or more of the destination receivers, wherein the additional destination receivers and the destination receivers collectively provide two levels of a clock tree fan out configuration.

12. A method for processing data, comprising:
receiving a clock signal at a number of destination receivers, wherein the number of destination receivers is a multiple of five; and
providing a metal interconnect element having a number of equidistant pathways to the destination receivers that enable the clock signal to arrive at each of the destination receivers in a substantially equivalent time interval;
wherein the number of equidistant pathways is equal to the number of destination receivers; and
wherein the metal interconnect element is not trimmed or coupled to a dumb receiver.

13. The method of claim 12, further comprising:
providing the clock signal to the source driver such that the source driver may communicate the clock signal to one or more of the destination receivers.

14. The method of claim 12, further comprising:
providing a plurality of nodes operable to couple the destination receivers to the metal interconnect.

15. The method of claim 12, further comprising:
providing redundant paths from the source driver to the destination receivers in order to provide substantially equivalent delays associated with each of the destination receivers receiving the clock signal.

16. The method of claim 12, further comprising:
providing a plurality of additional destination receivers operable to receive the clock signal from one or more of the destination receivers, wherein the additional destination receivers and the destination receivers collectively provide two levels of a fan out configuration.

17. The method of claim 12, further comprising:
packaging the source driver and the destination receivers in an integrated circuit that is operable to execute one or more processing tasks.

* * * * *